(12) United States Patent
Taylor et al.

(10) Patent No.: US 7,887,143 B2
(45) Date of Patent: Feb. 15, 2011

(54) APPARATUS WHICH ALLOWS FOR THE COUNTER ROTATION OF A WHEEL ACCESSORY

(76) Inventors: Andrew C. Taylor, 883 Harbor Bend Rd., Memphis, TN (US) 38103; Reid Averill, 2749 Bayhill Woods Cove, Collierville, TN (US) 38017

( * ) Notice: Subject to any disclaimer, the term of this patent is extended or adjusted under 35 U.S.C. 154(b) by 0 days.

(21) Appl. No.: 12/144,589

(22) Filed: Jun. 23, 2008

(65) Prior Publication Data
US 2008/0315673 A1 Dec. 25, 2008

Related U.S. Application Data

(60) Provisional application No. 60/945,369, filed on Jun. 21, 2007.

(51) Int. Cl.
*B60B 7/04* (2006.01)
(52) U.S. Cl. .............................. 301/37.25; 301/37.108
(58) Field of Classification Search .............. 301/37.25, 301/37.102, 37.106, 37.376; 40/587
See application file for complete search history.

(56) References Cited

U.S. PATENT DOCUMENTS

| | | | |
|---|---|---|---|
| 6,443,529 B1 | 9/2002 | Williams | |
| 6,637,830 B1 * | 10/2003 | Burgess | 301/37.25 |
| 6,663,187 B2 | 12/2003 | Fitzgerald | |
| 6,857,709 B1 | 2/2005 | McLean et al. | |
| D510,898 S | 10/2005 | Fowlkes | |
| 6,964,454 B1 | 11/2005 | Miansian et al. | |
| 6,978,544 B1 | 12/2005 | Eikhoff et al. | |
| 7,100,995 B2 | 9/2006 | Gilly et al. | |
| 7,121,631 B2 | 10/2006 | Strzelczyk | |
| 7,213,888 B2 * | 5/2007 | Simpson | 301/37.25 |
| 7,354,113 B2 * | 4/2008 | Marriott | 301/37.25 |
| 7,413,260 B2 * | 8/2008 | Gabriel | 301/37.25 |
| 2002/0036426 A1 | 3/2002 | Fowlkes | |
| 2004/0183359 A1 | 9/2004 | Fowlkes | |
| 2005/0146203 A1 * | 7/2005 | Lin | 301/37.25 |

* cited by examiner

*Primary Examiner*—Jason R Bellinger
(74) *Attorney, Agent, or Firm*—Julie R. Baldridge; Baker, Donelson, Bearman, Caldwell & Berkowitz, PC (57) ABSTRACT

An apparatus which allows for the counter rotation of a wheel accessory is disclosed. The apparatus is intended for mounting on a wheel of a vehicle. The apparatus has a base plate for attaching to the wheel, a transmission mechanism coupled to the base plate and a rotation prevention mount attached to the transmission mechanism. The transmission mechanism has an input shaft and an output shaft which extend in opposite directions from the transmission mechanism. The input shaft rotates in the direction of the vehicular wheel. The output shaft rotates counter to the vehicular wheel. A method for using a wheel accessory that rotates counter to the rotation of a vehicular wheel is also disclosed.

12 Claims, 15 Drawing Sheets

APPARATUS WHICH ALLOWS FOR THE COUNTER ROTATION OF A WHEEL ACCESSORY

RELATED APPLICATIONS

PURSUANT TO 35 USC §119(e), PRIORITY IS CLAIMED TO APPLICATION NO. 60/945,369

STATEMENT REGARDING FEDERALLY SPONSORED RESEARCH OR DEVELOPMENT

NOT APPLICABLE

REFERENCE A "MICROFICHE APPENDIX"

NOT APPLICABLE

FIELD OF THE INVENTION

The present invention relates to an apparatus which allows for the counter rotation of a wheel accessory. In particular, the present invention relates to an apparatus mounted on the wheel of vehicle wherein such apparatus produces rotation opposite than the rotation of the wheel.

BACKGROUND OF THE INVENTION

Wheel attachments and special hubs have been in use for years in various applications. Typically, wheel attachments and/or hubs are comprised of different forms. Currently, wheel attachments, such as spinning rims, rotate independently but have a tendency to rotate in the direction of the wheel. There are other rims, such as floaters, which do not rotate.

The main problem with conventional wheel attachments and/or hubs where motion of the wheel attachment or rim is desired in a direction opposite of that of the wheel is that current designs cause this motion to be random at best. While these current devices may be suitable for the particular purpose to which they address, they are not as suitable for having a wheel attachment on a wheeled vehicle which provides a rotation opposite that of the wheel. Therefore, to achieve such motion predictably, it is desirable to use a mechanical apparatus to control this motion.

It is an objective of the present invention to provide an apparatus that substantially departs from the conventional concepts and designs of the prior art, and in doing so, to provide an apparatus primarily developed for the purpose of having a wheel attachment on a wheeled vehicle which provides a rotation opposite that of the wheel.

BRIEF SUMMARY OF THE INVENTION

The present invention discloses an apparatus which allows for the counter rotation of a wheel accessory. The apparatus is for mounting over a wheel of a vehicle. The vehicle has a plurality of lug bolts and at least one wheel well. The apparatus is made of a base plate, a transmission mechanism and a rotation prevention mount. The base plate is for attaching to the wheel. The base plate has at least one aperture configured to receive a lug bolt of the wheel. The transmission mechanism has an input shaft and an output shaft which extend in opposite directions from the transmission mechanism. The input shaft is coupled to the base plate and rotates in the direction of the wheel. The output shaft is coupled to a wheel accessory and rotates counter to the wheel.

In one embodiment, the base plate has three radial members each member having one aperture. In one embodiment, the transmission mechanism has a non-rotatable housing. In one embodiment, the transmission mechanism is a gear differential. In another embodiment, the transmission mechanism is a ball differential. In still another embodiment, the transmission mechanism is a belt drive. In still another embodiment, the transmission mechanism is a chain drive. In still another embodiment, the transmission mechanism is a pulley system. In still another embodiment, the transmission mechanism is a fluid system. In still another embodiment, the transmission mechanism has at least three bevel gears.

In one embodiment, the rotation prevention mount is a counterweight that weighs at least 0.25 pounds. In another embodiment, the rotation prevention mount is a counterweight that weighs from about 0.25 pounds to about 4.0 pounds. In one embodiment, the rotation prevention mount is two to four inches away from the center of rotation. In another embodiment, the rotation prevention mount is from four to ten inches away from the center of rotation. In one embodiment, the rotation prevention mount is a rotation prevention rod which has a proximal end and a distal end. The proximal end is coupled to the transmission mechanism and the distal end is coupled to the wheel well. In another embodiment, the rotation prevention mount is magnetic coupling. Magnetic coupling includes a plurality of magnets. Two magnets are coupled to the transmission mechanism and two magnets are coupled to the wheel well.

The present invention further discloses a method for mounting a wheel accessory onto a vehicular wheel. The wheel accessory rotates counter to the vehicular wheel which has a plurality of lug bolts. The method has the following steps: (1) providing a base plate, a transmission mechanism and a rotation prevention mount. The base plate has at least one aperture configured to receive a lug bolt of a wheel. The transmission mechanism has an input shaft and an output shaft which extend in opposite directions from the transmission mechanism. The input shaft is configured to attach to the base plate and to rotate in the direction of the wheel. The output shaft is configured to attach to a wheel accessory and to rotate counter to the wheel. The rotation prevention mount is coupled to the transmission mechanism; (2) attaching the input shaft of the transmission mechanism to the base plate; (3) securing the base plate to the wheel of a vehicle; (4) attaching the wheel accessory to the output shaft and (4) putting the vehicular wheel in motion.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE INVENTION

Figure 1:
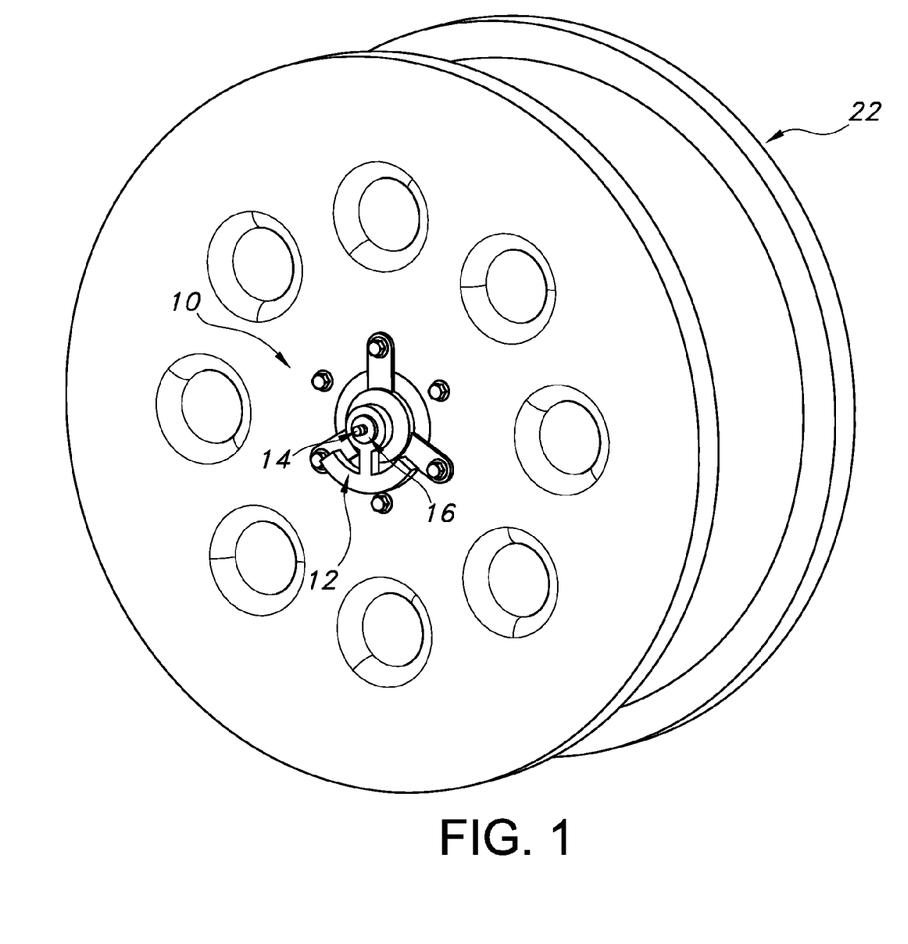
FIG. 1 is a perspective view of an apparatus which allows for counter rotation of a wheel accessory.
Figure 2:
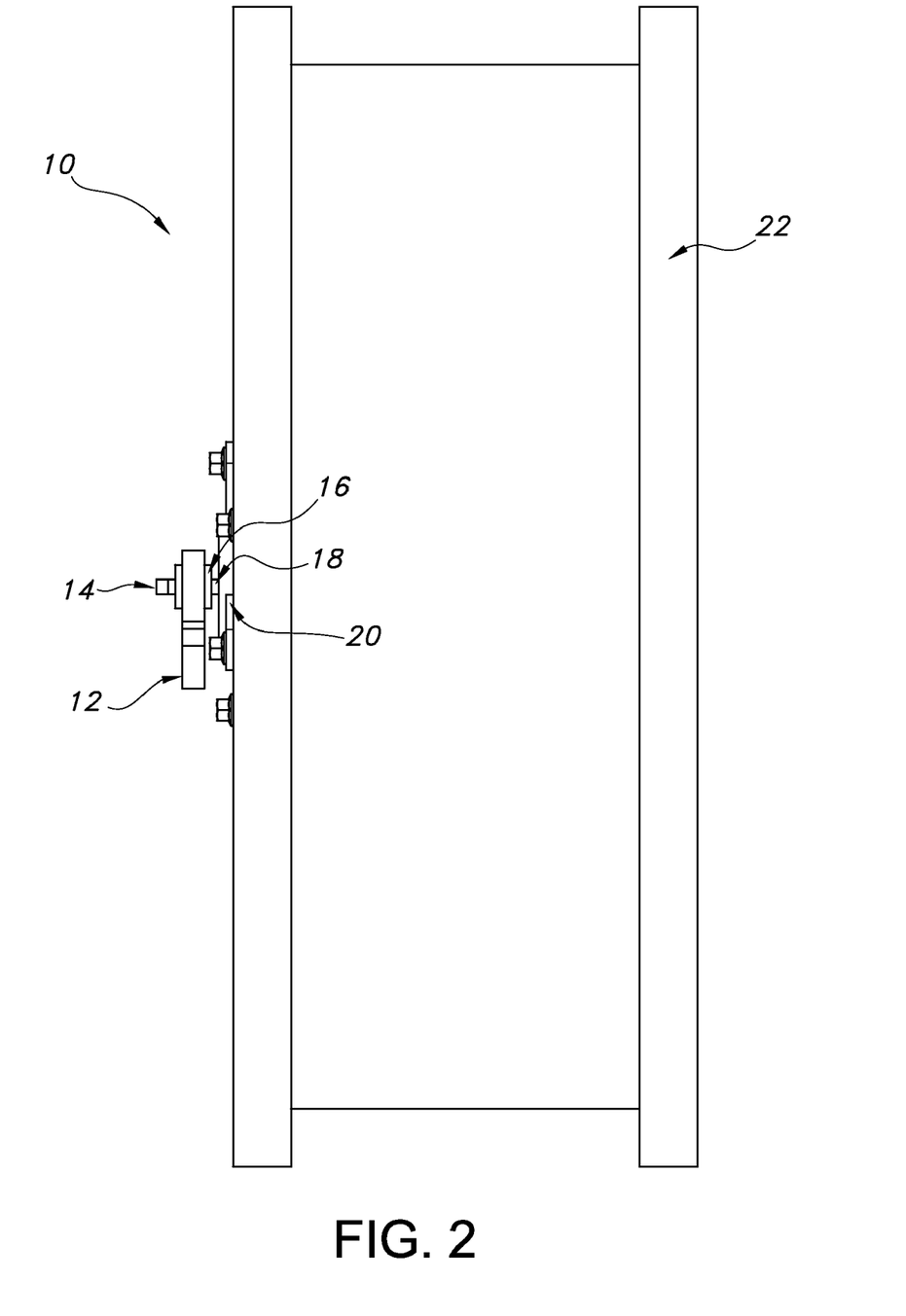
FIG. 2 is a side view of an apparatus which allows for counter rotation of a wheel accessory.

The present invention provides apparatus 10 which allows for the counter rotation of a wheel accessory, as shown generally in FIGS. 1-18. Referring to FIGS. 1-2, apparatus 10 includes base plate 20, transmission mechanism 16 and rotation prevention mount 12. Transmission mechanism 16 has output shaft 14 which rotates counter to wheel 22 and input shaft 18 which rotates in the direction of wheel 22. Input shaft 18 is attached to base plate 20 for attachment to wheel 22. Rotation prevention mount 12 is further operatively attached to transmission mechanism 16. Apparatus 10 allows for counter-rotation of a wheel accessory through output shaft 14.

Figure 3:
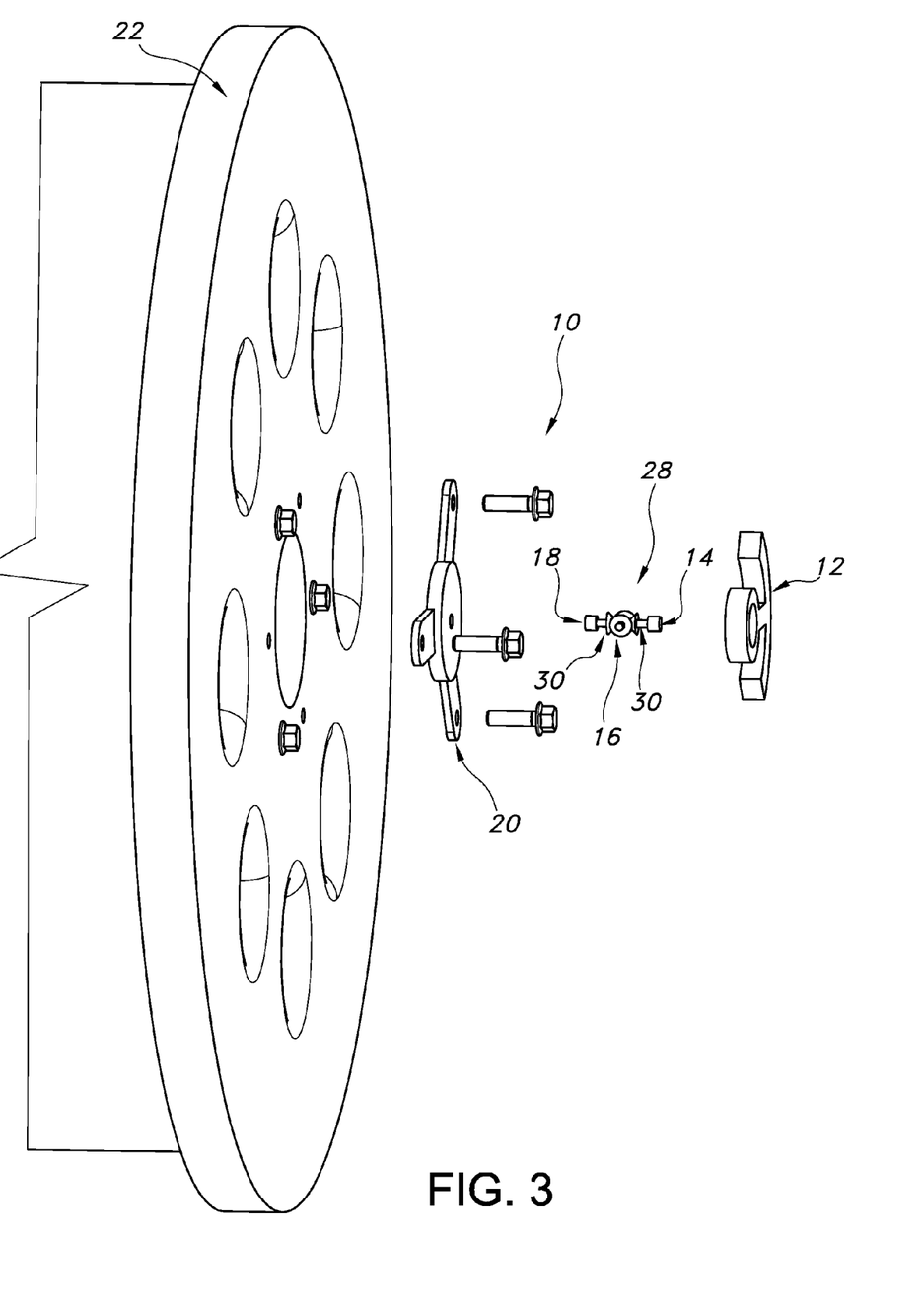
FIG. 3 is an exploded view of an apparatus which allows for counter rotation of a wheel accessory.
Figure 3A:
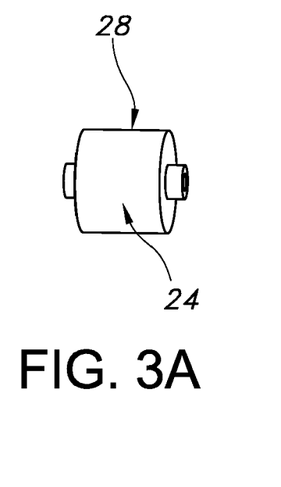
FIG. 3A is a perspective view of a gear differential encased in housing.
Figure 4:
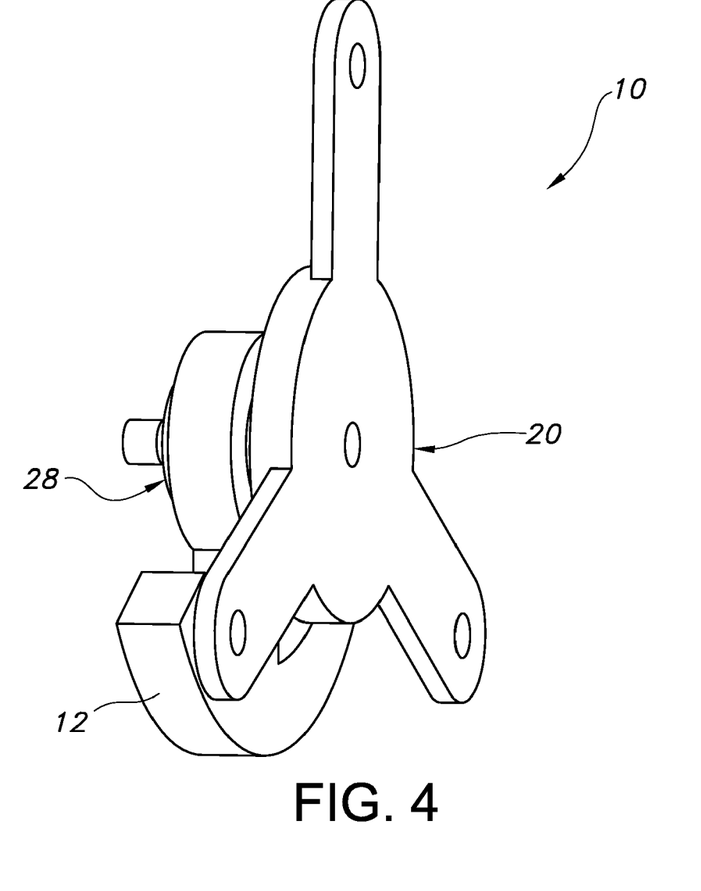
FIG. 4 is a rear perspective view of an apparatus which allows for counter rotation of a wheel accessory.
Figure 5:
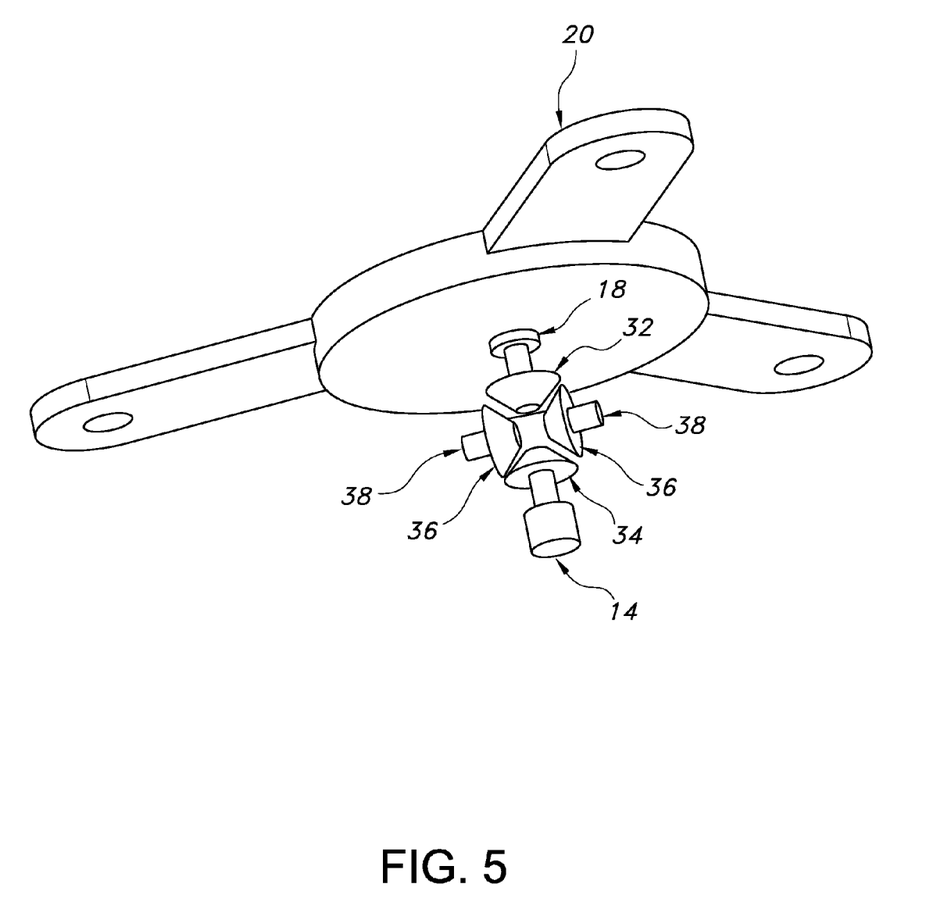
FIG. 5 is a perspective view of the components of a transmission mechanism coupled to a base plate.
Figure 6:
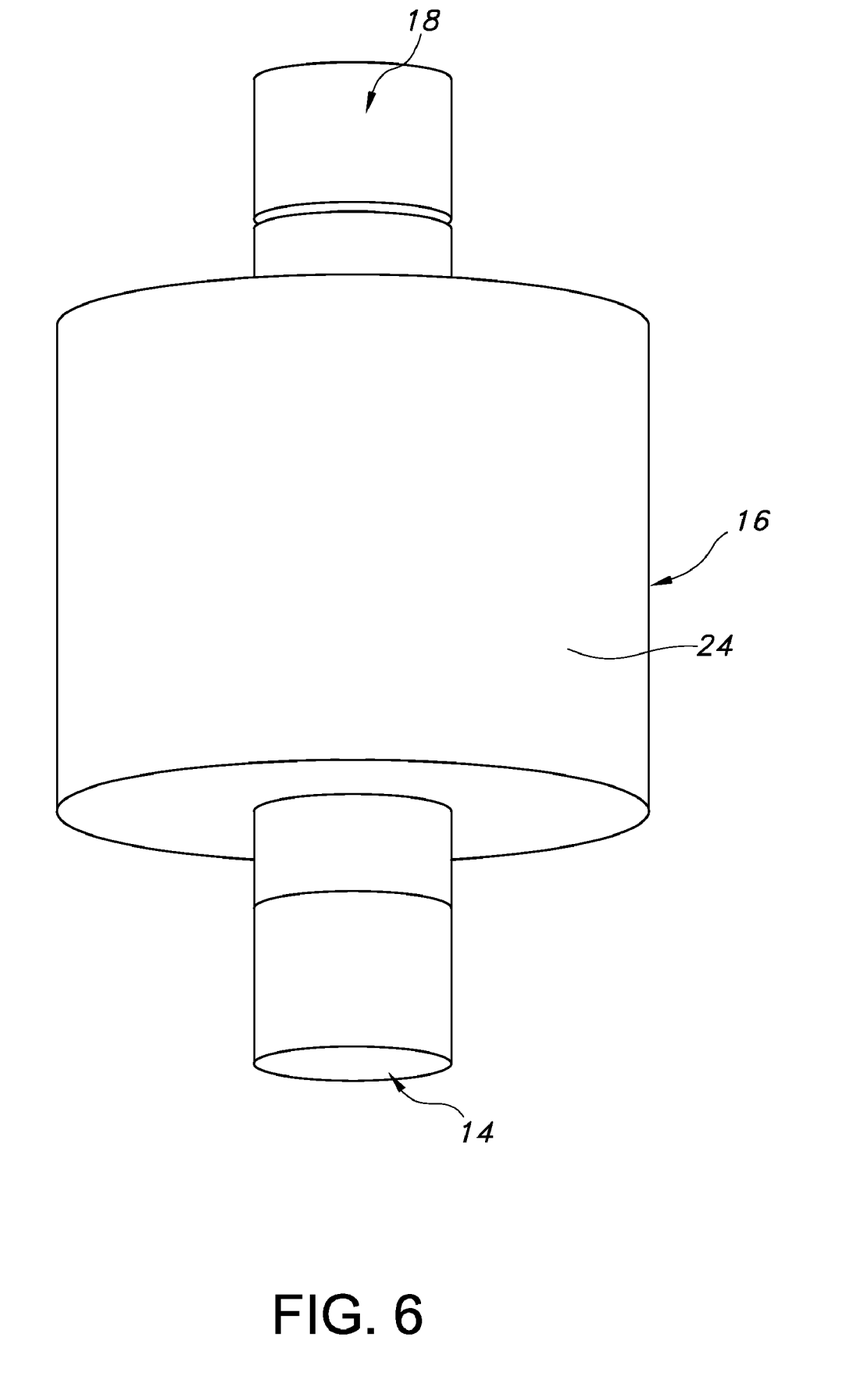
FIG. 6 is a side view of the transmission mechanism with housing.
Figure 7:
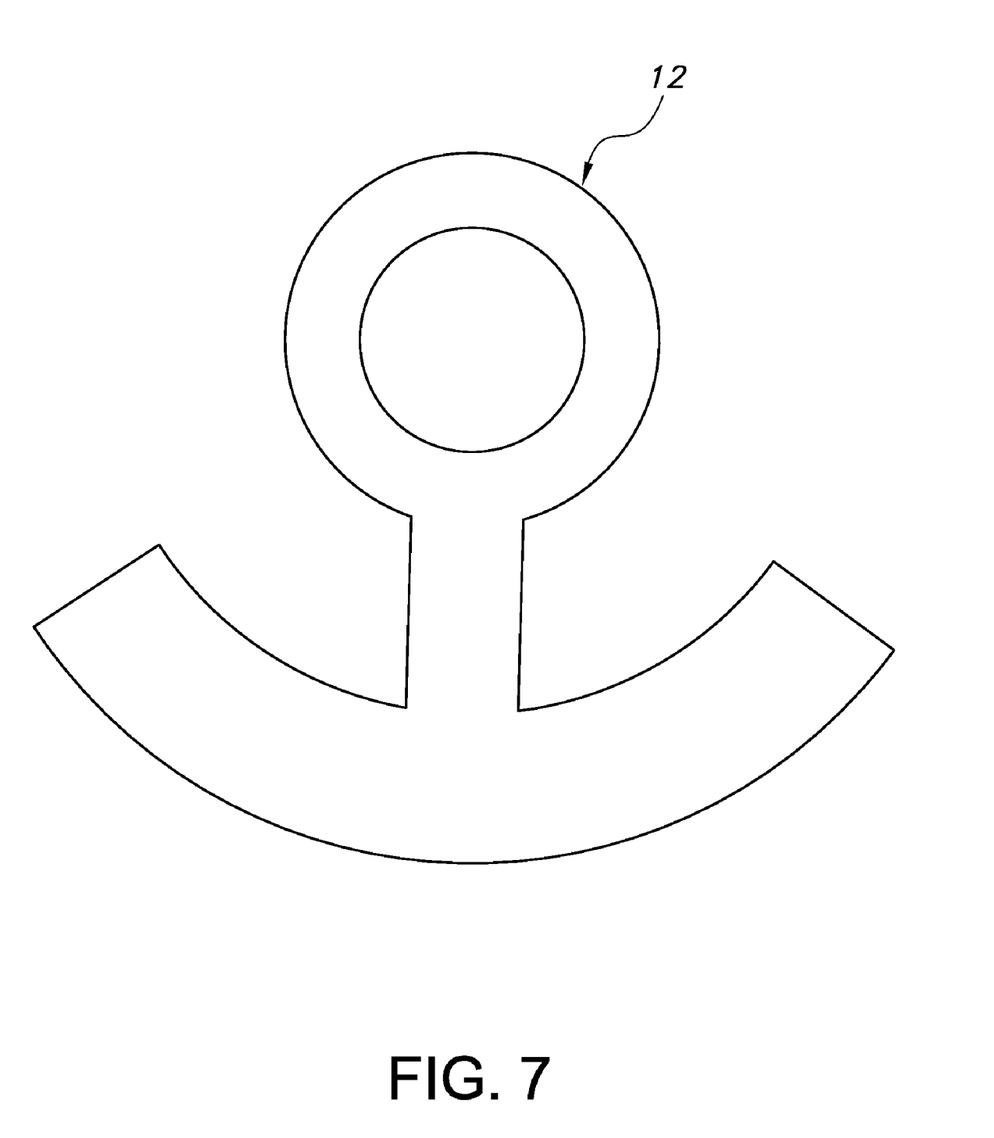
FIG. 7 is a front view of the rotation prevention mechanism.
Figure 8:
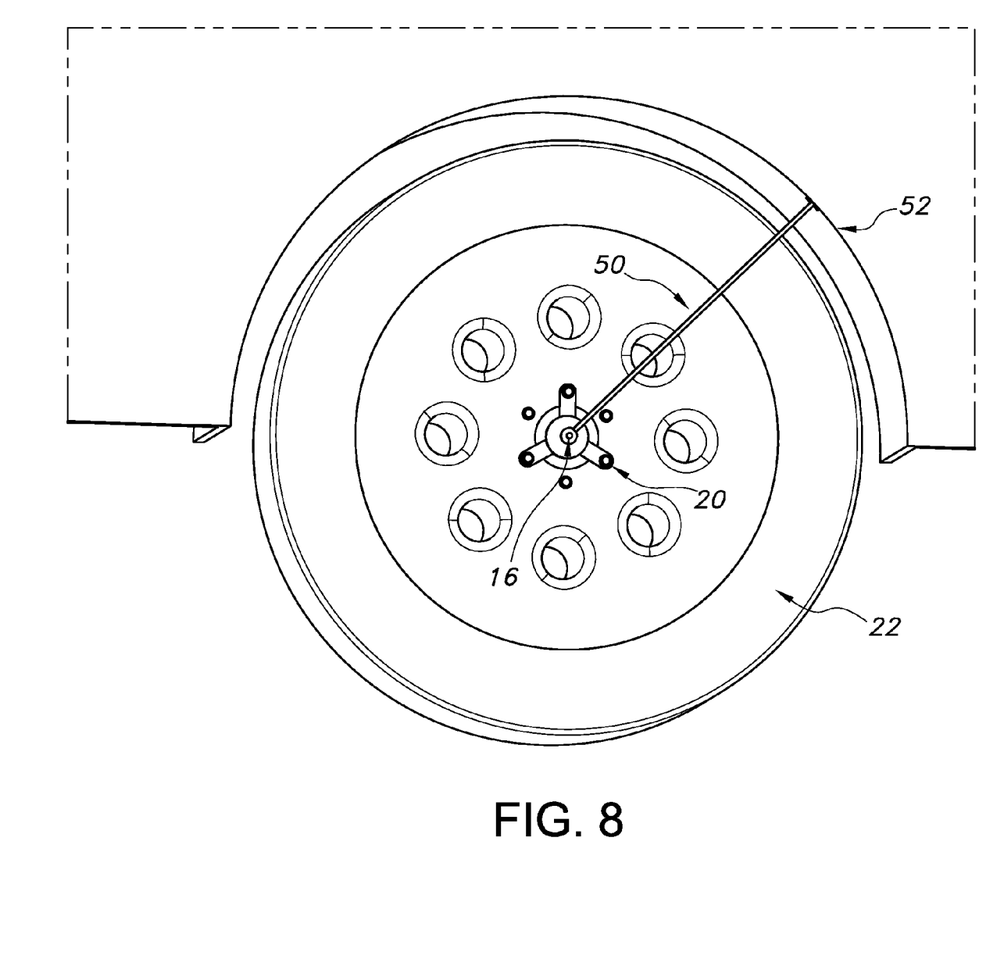
FIG. 8 is a front perspective view of a rotation prevention rod.

Referring now to FIGS. 3, 5-6, in one embodiment, transmission mechanism 16 is a gear differential 28 encased in housing 24. Gear differential 28 converts rotation from wheel 22 or axle to counter rotation of output shaft 14. The rotation converted can be at the same speed of wheel 22 or at a different speed depending on the gear ratio used. In one embodiment, gear differential 28 has four bevel gears 30, straight cut at 45 degrees with equal numbers of teeth (not shown) to provide counter-rotation of the output shaft 14 at the same speed as the wheel 22. Different speeds of rotation can be achieved with unequal numbers of teeth of bevel gears 30. Carbon steel or steel alloy are appropriate materials for bevel gears 30. Two of the bevel gears 30, input gear 32 and output gear 34, share the same axis of rotation and are part of input shaft 18 and output shaft 14, respectively. The other two bevel gears 30 are coupling gears 36 to the input gear 32 and output gear 34 that are fixed to housing 24. Each bevel gear 30 is fitted with a bearing 38 pressed into a slot in housing 24. In one embodiment, gear differential 28 of this form is manufactured with the input shaft 18 and output shaft 14. In another embodiment, gear differential 28 has three bevel gears: input gear 32, output gear 34 and one coupling gear 36.

As the vehicle is in motion, wheels 22 rotate in a specific direction. Through gear differential 28 with the aid of rotation prevention mount 12, apparatus 10 produces a rotation of output shaft 14 in the opposite direction of wheel 22 direction. Thus, wheel 22 creates a rotational force through gear differential 28 to rotate output shaft 14 in the opposite direction. As shown in FIG. 5, input shaft 18 is part of or attached to input gear 32 (i.e. a driving gear). Input gear 32 is coupled with at least one other coupling gear 36 at a specific angle, preferably 45 degrees. Coupling gear 36 is then in mesh with output gear 34 (i.e. the driven gear) at the same angle. While input gear 32 rotates in a certain direction with coupling gear 36 stationary from the inertia of rotation prevention mount 12, output gear 34 must rotate in the opposite direction of input gear 32. In one embodiment, gear differential 28 is a ⅛ scale remote controlled car center differential.

Referring now to FIG. 6, in one embodiment, transmission mechanism 16 is enclosed within housing 24 including appropriate lubricating fluids. Housing 24 has a diameter of 1.2 inches but other diameters may be used as desired by one skilled in the art. The size of housing 24 will vary depending on the power transmitting system used as desired by one of skill in the art (examples of power transmitting systems are discussed below).

Transmission mechanism 16 can be any suitable power transmitting system as desired by one skilled in the art, such as a ball differential, belt or chain drive, a pulley system, a fluid system, or a combination of the above.

Transmission mechanism 16 has input shaft 18 and output shaft 14 which extend in opposite directions from transmission mechanism 16. Input shaft 18 can have any suitable geometry to attach to base plate 20 (as described below) which attaches to wheel 22. Further, the geometry of a cross-section of input shaft 18 can vary along the length of input shaft 18 if needed for mounting purposes. In one embodiment, input shaft 18 is made of aluminum alloy but any material that allows input shaft 18 to transmit power from wheel 22 or axle to transmission mechanism 16 may be used as desired by one of skill in the art. Input shaft 18 is manufactured such that it can be attached to base plate 20. In another embodiment, input shaft 18 may be attached to wheel 22 of a vehicle without base plate 20. Attachment may include welding, fasteners or adhesives as desired by one skilled in the art.

Output shaft 14 can have any suitable geometry to attach to any suitable wheel accessory. Output shaft 14 provides counter-rotation to such wheel accessory once attached. The geometry of a cross-section of output shaft 14 can vary along the length of output shaft 14 if needed for mounting purposes. In one embodiment, output shaft 14 is made of aluminum alloy but any other material, such as a stiff alloy, may be used as desired by one of skill in the art. Output shaft 14 is manufactured with appropriate holes or threads for attaching a desired wheel accessory.

Referring now to FIGS. 1-4, and 7, rotation prevention mount 12 is preferably an inertial element, i.e. an offset mass or counterweight, operatively attached to housing 24 of transmission mechanism 16 by a collar clamp (not shown). Rotation prevention mount 12 prevents transmission mechanism 16 from rotating. Essentially, rotation prevention mount 12 prevents coupling gears 36 from rotating around the axis of input shaft 18. If coupling gears 36 or housing 24 were to rotate about the axis of the input shaft 18 at the same speed as input shaft's 18 rotation, output shaft 14 would fail to rotate counter to wheel 22. Without the presence of rotation prevention mount 12, coupling gears 36 would begin to rotate in the same direction as wheel 22 because of friction, and eventually at the same speed as wheel 22. Coupling gears 36 must rotate about their stationary axis, and this rotation is made possible by rotation prevention mount 12. Therefore, rotation prevention mount 12 provides counter-rotation of the output shaft 14. Rotation prevention mount 12 may be manufactured in any geometrical form as desired by one skilled in the art as long as its center of mass is displaced from the center of rotation of input shaft 18. The appearance and shape of rotation prevention mount 12 can be used to conceal its presence. Rotation prevention mount 12 may be in various sizes and shapes depending on the size of wheel 22.

In one embodiment, counterweight of rotation prevention mount 12 is connected to housing 24 of transmission mechanism 16 by using a collar clamp but any means of attachment such as fasteners, adhesives, or welding may be used as desired by one skilled in the art. In another embodiment, rotation prevention mount 12 is attached to shaft of a coupling gear 36 of transmission mechanism 16. The rotation prevention mount 12 may be welded, adhesively bonded or mechanically fastened to the shaft of coupling gear 36.

In one embodiment, rotation prevention mount 12 is a counterweight having a weight of at least 0.25 pounds but any other weight between the range of 0.25 pounds to 4.0 pounds may be used as desired by one of skill in the art. The counterweight of rotation prevention mount 12 is about two to four inches from the axis of rotation but any distance may be used depending on the size of the wheel and the weight of rotation prevention mount 12 to produce rotational inertia and moment required to prevent rotation. The axis of rotation is the axis of the input shaft 18. The center of gravity of the rotation prevention mount 12 (or the counterweight) should be as far away from the axis of rotation as possible to maximize inertia. In one embodiment, the distance is between 2 and 3 inches due to the spatial constraints of wheel 22. In other cases, the counterweight may be 10 inches from the axis of rotation if attached to a twenty two inch wheel.

In another embodiment, rotation prevention mount 12 is pie shaped circle having a greater thickness or differential material at one area of the geometry as to create an offset mass (not shown). Rotation prevention mount 12 may be attached through the use of threaded fasteners or adhesives depending on the ease of assembly and/or disassembly desired. In one embodiment, rotation prevention mount 12 is made of aluminum alloy but any other material, such as a dense polymer, may be used as desired by one of skill in the art as long as the material used allows the center of mass of the rotation prevention mount 12 to be sufficiently distanced from the transmission mechanism 16.

Rotation prevention mount 12 may be any suitable device that prevents rotation of transmission mechanism 16. In one embodiment, a rotation prevention rod 50, shown generally in FIGS. 8-11, is used to prevent rotation of transmission mechanism 16. In another embodiment, magnetic coupling, shown generally in FIGS. 12-15, is used to prevent rotation of transmission mechanism 16.

Figure 9:
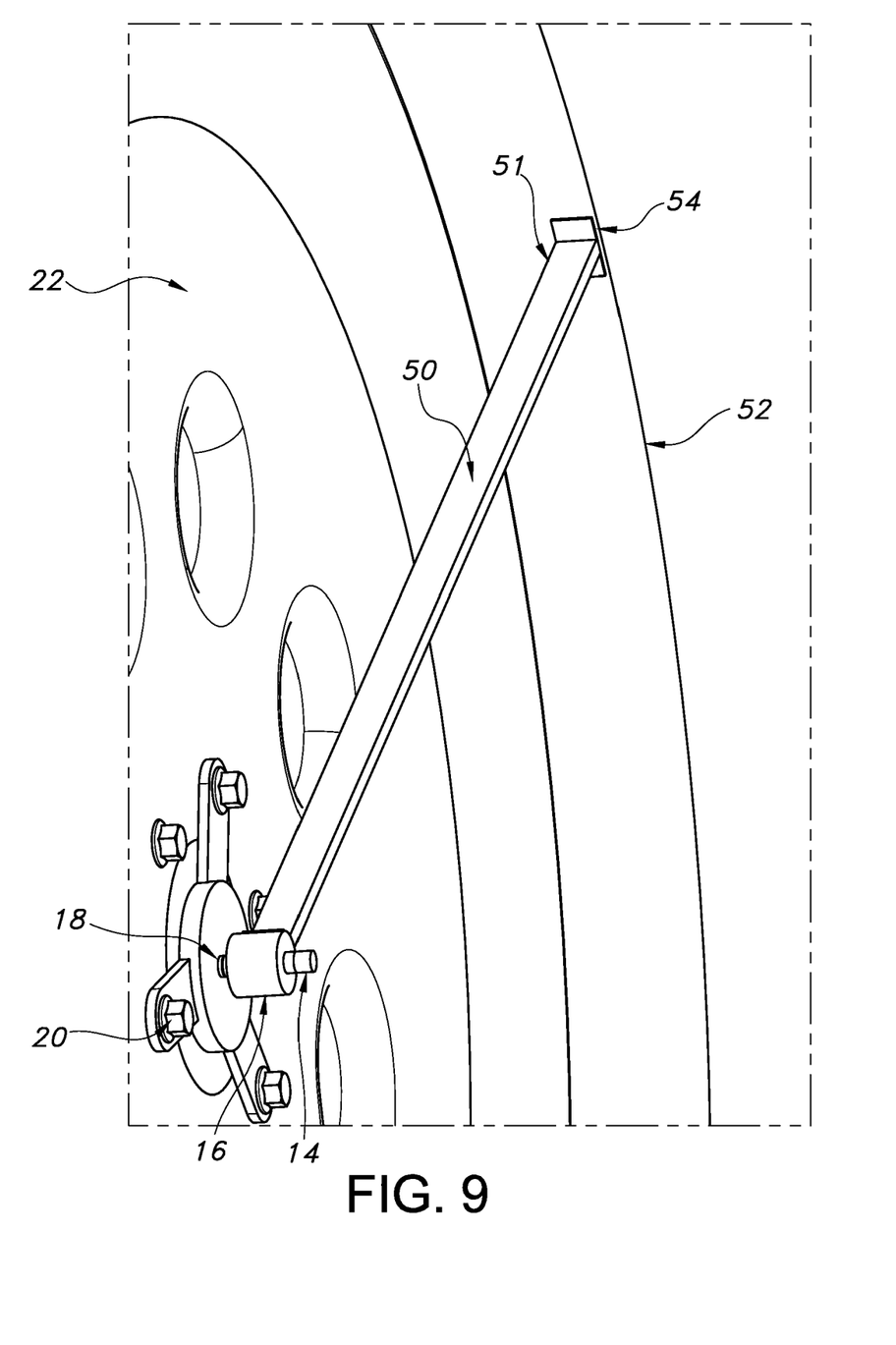
FIG. 9 is a detailed perspective view of the rotation prevention rod.
Figure 10:
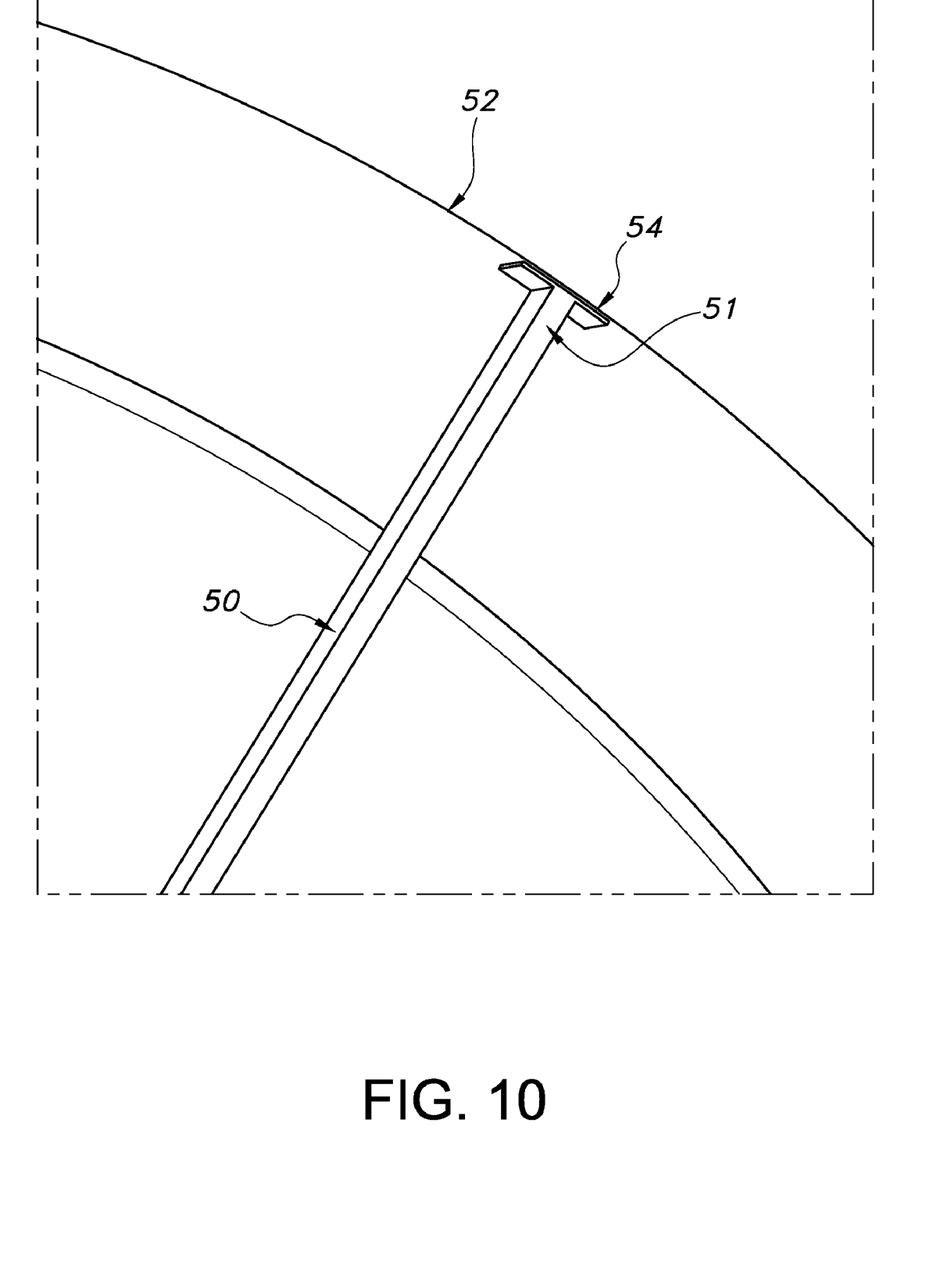
FIG. 10 is a detailed perspective view of the rotation prevention rod with a wheel well connecting plate.
Figure 11:
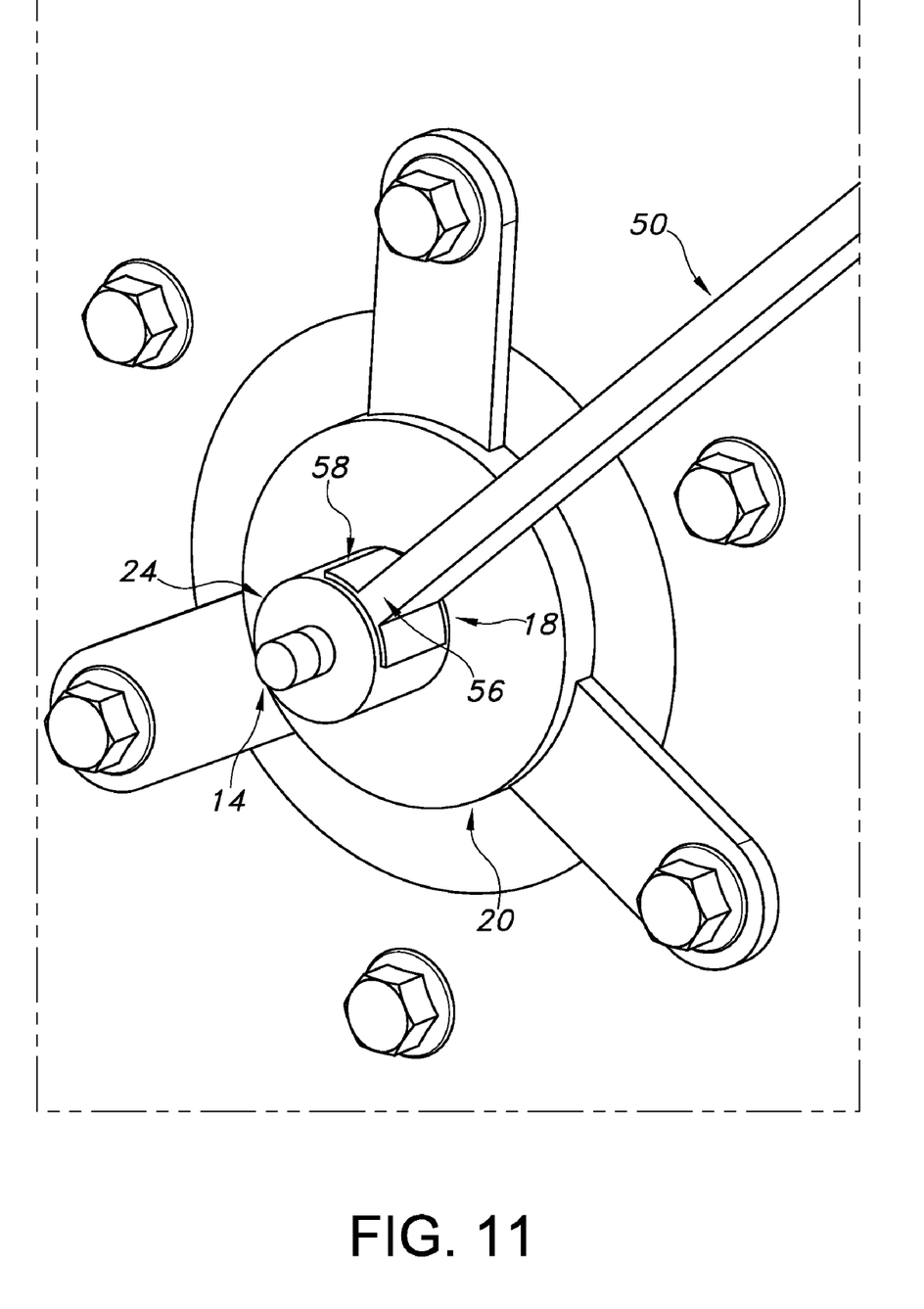
FIG. 11 is a detailed perspective view of the rotation prevention rod with a transmission housing connecting plate.
Figure 12:
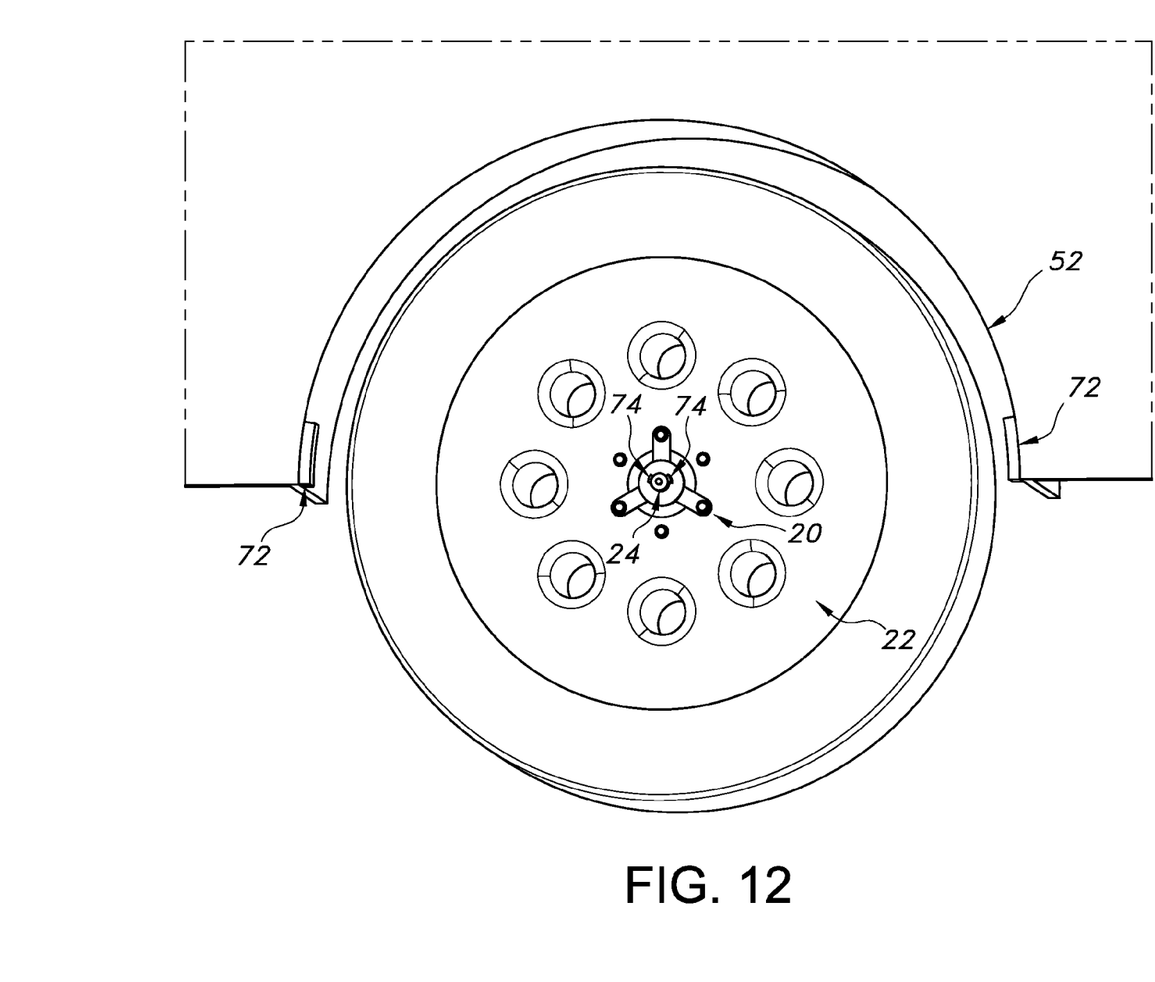
FIG. 12 is a front perspective view of a magnet coupling.
Figure 13:
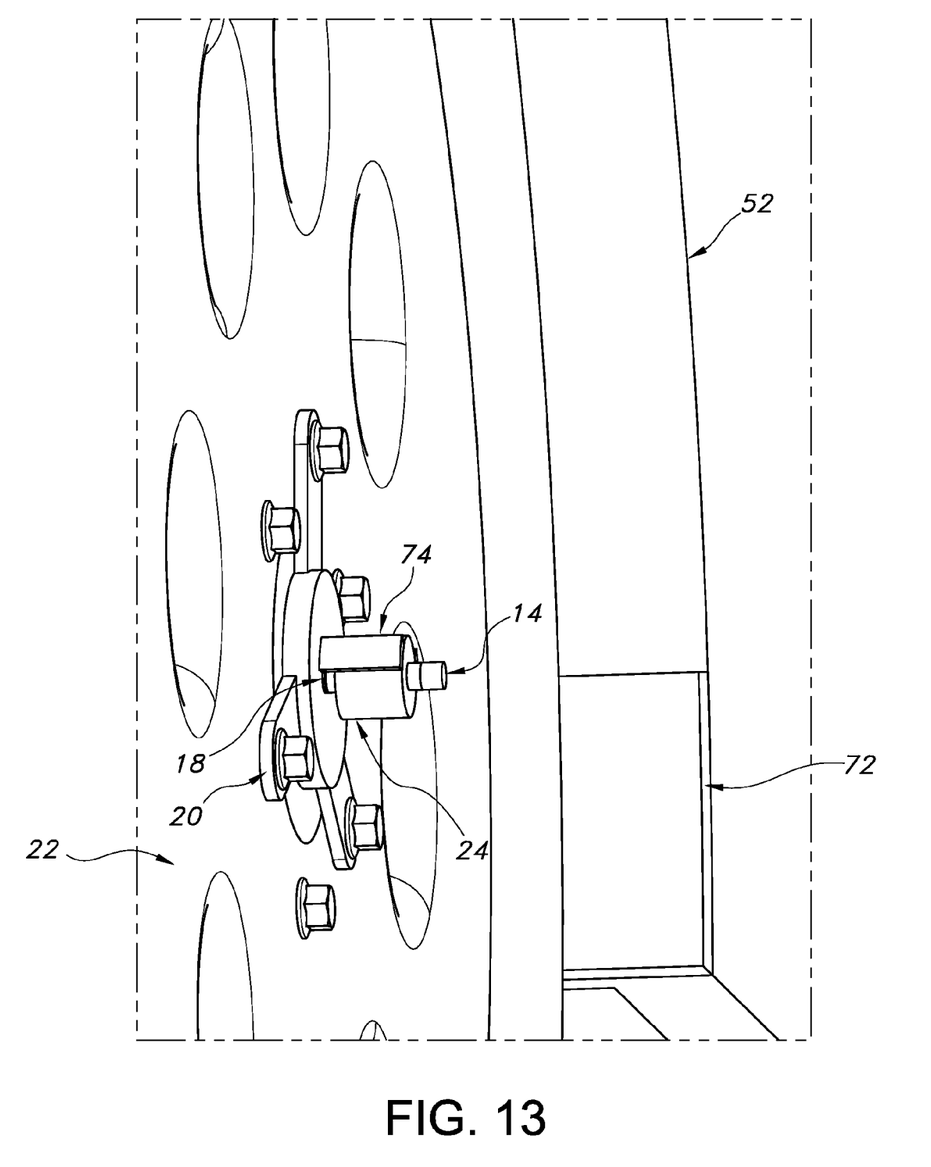
FIG. 13 is a detailed perspective view of the magnetic coupling.

Rotation prevention rod 50 is operatively connected at distal end 51 to wheel well 52 of a vehicle with a wheel well connecting plate 54, shown in FIGS. 9 and 10. Proximal end 56 of rotation prevention rod 50 is operatively connected to transmission housing connecting plate 58 which is operatively connected to transmission housing 24, as shown in FIG. 11. Essentially, rotation prevention rod 50 fixes transmission housing 24 to wheel well 52 relative to moving wheel 22. Rotation prevention rod 50 may be attached to any other fixed object as desired by one skilled in the art.

Figure 14:
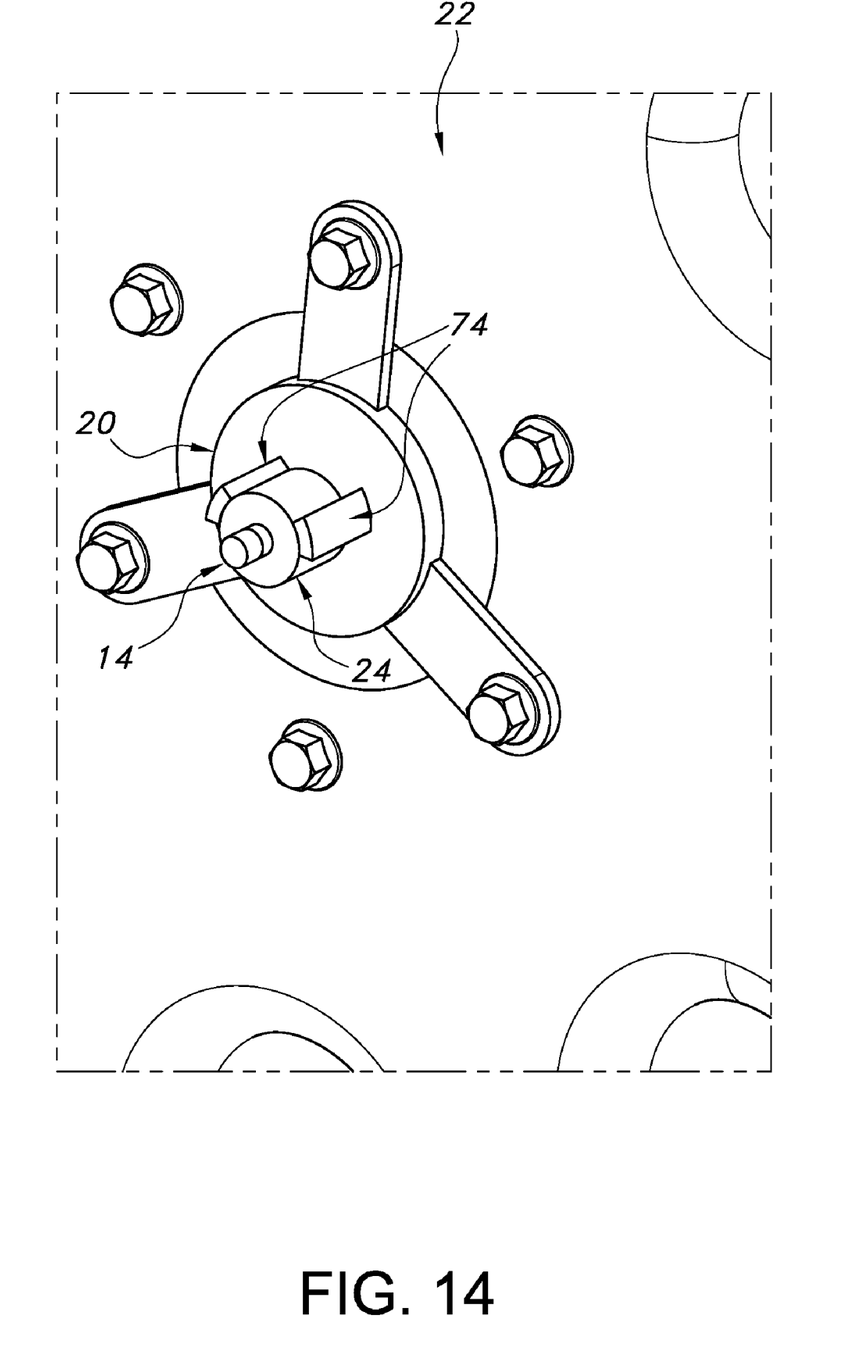
FIG. 14 is a detailed perspective view of magnets on the transmission housing of the magnetic coupling.
Figure 15:
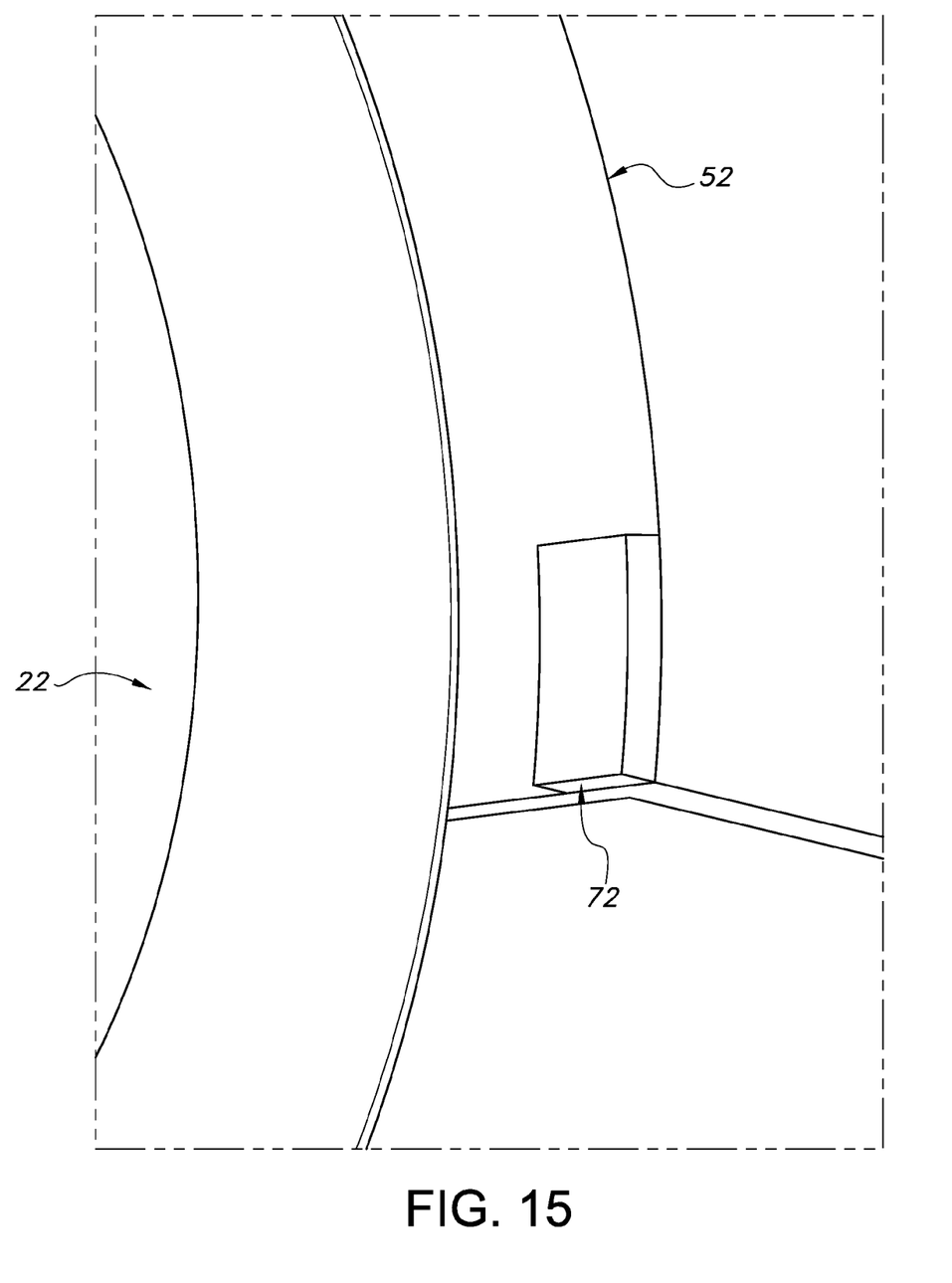
FIG. 15 is a detailed perspective view of a magnet on the wheel well of the magnetic coupling.

Referring now to FIGS. 12-15, magnetic coupling includes at least two sets of magnets 72 and 74, one set 72 operatively connected to wheel well 52 and one set 74 operatively connected to transmission housing 24 (shown in detail in FIG. 14). The magnetic forces between sets of magnets 72 and 74 on transmission housing 24 and on wheel well 52 prevent rotation of the transmission mechanism 16 encased in housing 24. Magnets 72 on wheel well 52 are shown connected at the far edges of the wheel well 52, but magnets 72 may be located anywhere on wheel well 52 as desired by one skilled in the art as long as magnets 72 on wheel well 52 are in alignment with magnets 74 on transmission housing 24 to allow for maximum advantage of the magnetic forces. Set of magnets 72 opposite those on transmission housing 24 may also be located on any other fixed object other than wheel well 52, as desired by one skilled in the art, as long as set of magnets 72 are in alignment with magnets 74 on transmission housing 24 to allow for maximum advantage of magnetic forces.

Apparatus 10 has base plate 20 for attaching apparatus 10 to wheel 22 of a vehicle. In one embodiment, input shaft 18 is attached at a rectangular cut in located at the center of base plate 20. Base plate 20 has three radially members that each has an aperture at the end of each member for attaching base plate 20 to the lug bolts of wheel 22. Input shaft 18 can be pinned, bolted, welded or press fit to the adapter. Base plate 20 can have another geometric shape as desired by one skilled in the art. Other attaching means may be used to attach transmission mechanism 16 and rotation prevention member 12 to wheel 22 as desired by one skilled in the art. An alternative attachment means may be an integral part of input shaft 18 and can be attached to wheel 22, for example, through a press fitting. A mounting bracket can provide support to and fix transmission mechanism 16 and rotation prevention member 12 to wheel 22. Mounting bracket can be attached to various components such as wheel 22, axle, combination of wheel 22 and axle or other various devices such as lugs and brakes located near the wheel area. Attachment can be accomplished through mechanical fastener, welds, press fits, locking devices, adhesives, or any other fastening device. Apparatus 10 can be removably attached or permanently attached to wheel 22 through any suitable attaching means.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described.

We claim:

1. An apparatus which allows for the counter rotation of a wheel accessory, wherein said apparatus is for mounting on a wheel of a vehicle, wherein said vehicle has a plurality of lug bolts and further has at least one wheel well, said apparatus comprising:
   a. a base plate for attaching to said wheel, wherein said base plate has at least one aperture configured to receive at least one lug bolt of the wheel;
   b. a transmission mechanism having an input shaft and an output shaft which extend in opposite directions from said transmission mechanism, wherein said input shaft is coupled to said base plate and rotates in the direction of said wheel, wherein said output shaft is coupled to said wheel accessory and rotates counter to said wheel; and
   c. a rotation prevention mount coupled to said transmission mechanism.

2. The apparatus of claim 1 wherein said base plate has three radial members each member having one aperture.

3. The apparatus of claim 1 wherein said transmission mechanism has a non rotatable housing.

4. The apparatus of claim 1 wherein said transmission mechanism is a gear differential.

5. The apparatus of claim 4 wherein said gear differential has at least three bevel gears.

6. The apparatus of claim 1 wherein said rotation prevention mount is a counterweight having a weight of at least 0.25 pounds.

7. The apparatus of claim 1 wherein said rotation prevention mount is a counterweight having a weight from about 0.25 pounds to about 4.0 pounds.

8. The apparatus of claim 1 wherein said rotation prevention mount is a counterweight which is from two to four inches from the center of rotation.

9. The apparatus of claim 1 wherein said rotation prevention mount is a counterweight which is from four to ten inches from the center of rotation.

10. The apparatus of claim 1 wherein said rotation prevention mount is a rotation prevention rod having a proximal end and a distal end wherein said proximal end is coupled to said transmission mechanism, wherein said distal end is coupled to said wheel well.

11. The apparatus of claim 1 wherein said rotation prevention mount is magnetic coupling including a plurality of magnets, wherein at least two of said magnets are coupled to said transmission mechanism, wherein at least two of said magnets are coupled to said wheel well.

12. A method for mounting a wheel accessory onto a vehicular wheel, wherein said wheel accessory rotates counter to said vehicular wheel having a plurality of lug bolts, comprising:

providing:
- a base plate having at least one aperture configured to receive at least one lug bolt of a wheel;
- a transmission mechanism having an input shaft and an output shaft, wherein said input shaft and output shaft extend in opposite directions from said transmission mechanism, wherein said input shaft is configured to attach to said base plate and to rotate in the direction of said wheel, wherein said output shaft is configured to attach to a wheel accessory and to rotate counter to said wheel; and
- a rotation prevention mount coupled to said transmission mechanism;

attaching said input shaft of said transmission mechanism to said base plate;
securing said base plate to said wheel;
attaching said wheel accessory to said output shaft; and
putting said vehicular wheel in motion.

* * * * *